(12) United States Patent
Diggelen et al.

(10) Patent No.: US 8,164,518 B2
(45) Date of Patent: Apr. 24, 2012

(54) METHOD AND SYSTEM FOR A GNSS RECEIVER WITH SELF-ASSISTED EPHEMERIS EXTENSIONS

(75) Inventors: Frank van Diggelen, San Jose, CA (US); Hongming Li, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 279 days.

(21) Appl. No.: 12/487,763

(22) Filed: Jun. 19, 2009

(65) Prior Publication Data

US 2010/0321236 A1 Dec. 23, 2010

(51) Int. Cl.
  *G01S 19/27* (2010.01)
(52) U.S. Cl. .................................. 342/357.66
(58) Field of Classification Search .............. 342/357.66
  See application file for complete search history.

(56) References Cited

U.S. PATENT DOCUMENTS

| | | | | |
|---|---|---|---|---|
| 7,570,208 B2 * | 8/2009 | Wang et al. | ............... | 342/357.63 |
| 2008/0270026 A1 * | 10/2008 | Han | ............... | 701/213 |
| 2010/0060518 A1 * | 3/2010 | Bar-Sever et al. | ........ | 342/357.12 |
| 2010/0134349 A1 * | 6/2010 | Lennen et al. | ........... | 342/357.03 |

OTHER PUBLICATIONS

Matthew M. Berry and Liam M. Healy, Jul.-Sep. 2004, The Journal of the Astronautical Sciences, vol. 52, No. 3, p. 331.*

* cited by examiner

*Primary Examiner* — Harry Liu
(74) *Attorney, Agent, or Firm* — Sterne, Kessler, Goldstein & Fox PLLC

(57) ABSTRACT

A GNSS enabled mobile device receives GNSS signals from visible GNSS satellites. Broadcast ephemeris is extracted from the received GNSS signals for generating ephemeris extension (future ephemeris) in the next several days for each of the visible GNSS satellites. The GNSS enabled mobile device uses the generated future ephemeris to determine a position fix even without fresh broadcast ephemeris completely received from the visible GNSS satellites. The generation of future ephemeris is scheduled according to the age of available ephemeris extensions and/or the time of visibility. Available ephemeris such as extracted broadcast ephemeris are integrated into an orbit model using the multi-step numerical integration methods and propagated to generate future ephemeris. The generated future ephemeris is reformatted into a desired orbit model and/or format of the GNSS enabled mobile device. A curve fitting polynomial of generated future ephemeris is stored instead of actual generated future ephemeris to conserve storage space.

22 Claims, 7 Drawing Sheets

METHOD AND SYSTEM FOR A GNSS RECEIVER WITH SELF-ASSISTED EPHEMERIS EXTENSIONS

CROSS-REFERENCE TO RELATED APPLICATIONS/INCORPORATION BY REFERENCE

NOT APPLICABLE.

FIELD OF THE INVENTION

Certain embodiments of the invention relate to communication systems. More specifically, certain embodiments of the invention relate to a method and system for a GNSS receiver with self-assisted ephemeris extensions.

BACKGROUND OF THE INVENTION

The Global Positioning System (GPS), the Global Navigation Satellite System (GLONASS), and the satellite navigation system GALILEO are three examples of Global Navigation Satellite Systems (GNSS). A GNSS utilizes an earth-orbiting constellation of a plurality of satellites each broadcasting signals that indicate its precise location and ranging information. From any location on or near the earth, GNSS receivers may normally determine their navigation information by acquiring the satellite signals broadcast from the plurality of GNSS satellites. The time to first fix (i.e. position computation) is enhanced when a GNSS receiver has prior access to a model of satellite orbits and clocks. This model is broadcast by GNSS satellites and is often referred to as ephemeris or ephemeris data. The ephemeris is broadcast to GNSS receivers as part of GNSS broadcasting signals or navigation messages. The broadcast ephemeris comprises navigational information of transmitting GNSS satellites. The navigational information may comprise standard satellite orbit models, clock model, and/or information about the operation status of the related GNSS satellites (healthy or unhealthy), which may be utilized for determining navigational information such as, for example, a position fix and a velocity of a GNSS receiver. The broadcast ephemeris is typically valid for a limited period of time such as 2 to 4 hours into the future (from the time of broadcast). Before the end of the period of validity, the GNSS receiver needs to obtain a fresh broadcast ephemeris to continue operating to produce an accurate position fix and/or velocity of the GNSS receiver.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for a GNSS receiver with self-assisted ephemeris extensions, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a GNSS receiver with self-assisted ephemeris extensions. In various embodiments of the invention, a GNSS enabled mobile device may be operable to receive GNSS signals from a plurality of visible GNSS satellites. The term visible indicates that the GNSS enabled mobile device is able to receive valid signals from a particular GNSS satellite. The GNSS enabled mobile device may be operable to extract broadcast ephemeris from the received GNSS signals to generate ephemeris extensions comprising future ephemeris for the next several days for each of the plurality of GNSS satellites in view. The generated future ephemeris may be utilized to determine a position fix of the GNSS enabled mobile device even without the GNSS enabled mobile device receiving and/or completely receiving fresh broadcast ephemeris from the plurality of visible GNSS satellites.

The GNSS enabled mobile device may be operable to schedule the generation of ephemeris extensions (future ephemeris) for each of the plurality of visible GNSS satellites according to various factors such as, for example, the age of available ephemeris extensions and/or the time of visibility of related GNSS satellites. Future ephemeris may be generated for each of visible GNSS satellites by integrating available ephemeris such as present or historic broadcast ephemeris into an orbit model such as solar radiation pressure model. Various numerical integration methods such as the multi-step numerical integration method may be used to determine associated orbit model parameters. The resulting orbit model may be used to propagate the available ephemeris of related GNSS satellites for the generation of corresponding future ephemeris. The generated future ephemeris may be reformatted into a desired model or format that may be suitable for use by the GNSS enabled mobile device. The generated future ephemeris may be curve fitted to determine a curve fitting polynomial for each of the visible GNSS satellites. Instead of actual generated future ephemeris, the determined curve fitting polynomial may be stored in a database inside the GNSS enabled mobile device to conserve storage space.

Figure 1:
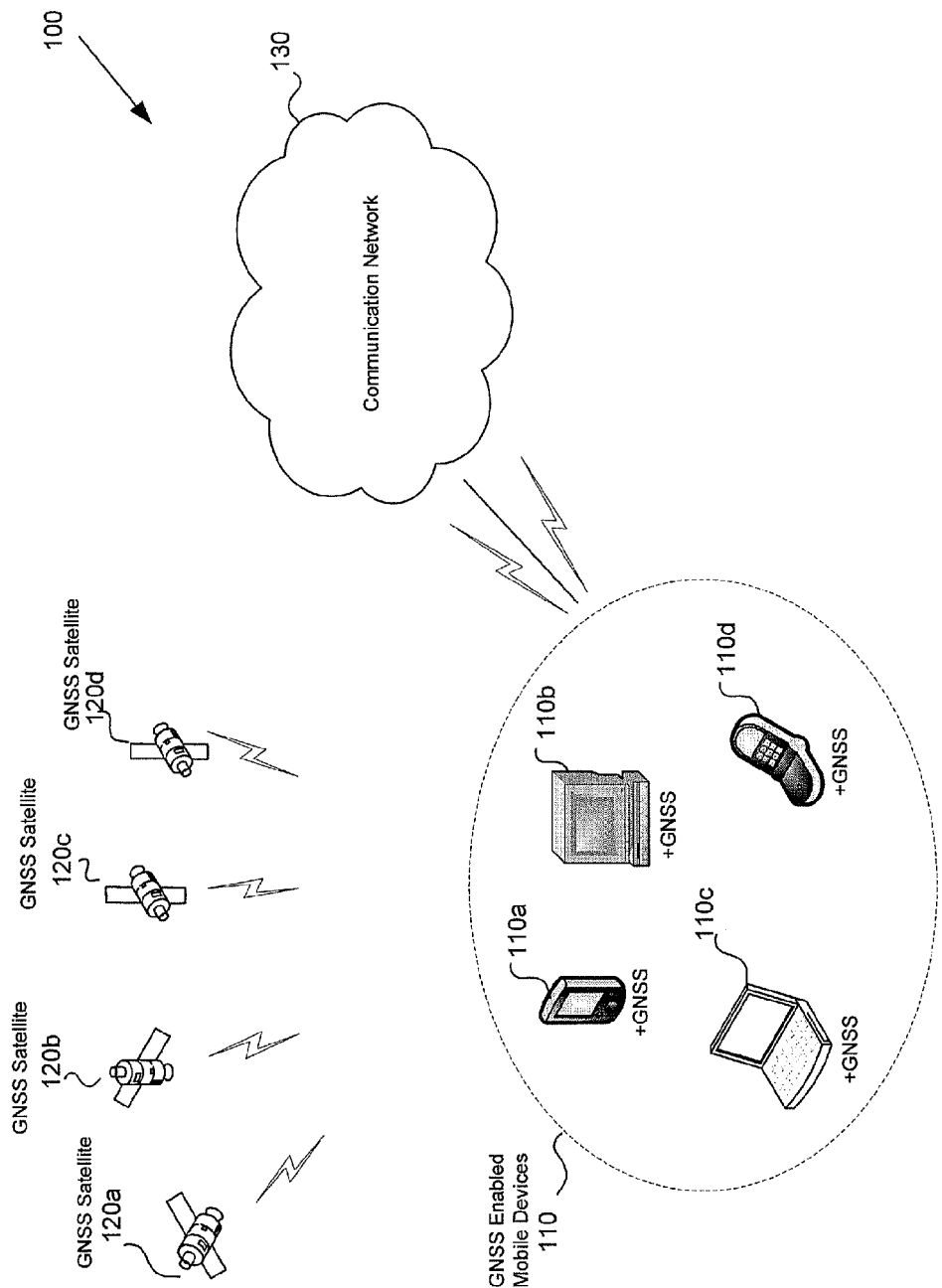
FIG. 1 is a diagram illustrating an exemplary communication system that enables locating of GNSS receivers using self-assisted ephemeris extensions on the GNSS receivers, in accordance with an embodiment of the invention.

FIG. 1 is a diagram illustrating an exemplary communication system that enables locating of GNSS receivers using self-assisted ephemeris extensions on the GNSS receivers, in accordance with an embodiment of the invention. Referring to FIG. 1, there is shown communication system 100. The communication system comprises a plurality of GNSS enabled mobile devices, of which GNSS enabled mobile devices 110a-110d are illustrated, a plurality of GNSS satellites, of which GNSS satellites 120a-120d are illustrated, and a communication network 130.

A GNSS enabled mobile device such as the GNSS enabled mobile device 110a may comprise suitable logic, circuitry, interfaces and/or code that are operable to communicate radio signals across the communication network 130 and receive GNSS broadcast signals from a plurality of visible GNSS satellites such as the GNSS satellites 120a through 120d. The received GNSS signals may be utilized to determine a position fix and/or a velocity of the GNSS enabled mobile device 110a for various location-based client applications such as, for example, emergency calling. The received GNSS signals may comprise ephemeris or ephemeris data of related GNSS satellites. The ephemeris may comprise navigational information such as satellite orbits models and/or clock models of the related GNSS satellites. Instantaneous locations-in-space of the visible GNSS satellites may be calculated using navigational information in the received ephemeris. The position fix of the GNSS enabled mobile device 110a may be estimated from the calculated instantaneous locations-in-space of the visible GNSS satellites.

The ephemeris may be updated at the related GNSS satellites such as the GNSS satellite 120a every two hours and valid for four hours (at the time of broadcast) in the case of GPS, for example. Using ephemeris beyond four hours may cause the calculated instantaneous satellite locations-in-space less accurate and result in an offset in the estimated position fix of the GNSS enabled mobile device 110a. In this regard, the GNSS enabled mobile device 110a may be operable to compute or predict ephemeris extensions or future ephemeris for each of the GNSS satellites using available ephemeris and/or satellite measurements. The available ephemeris may comprise present and/or historic broadcast ephemeris extracted from GNSS signals or aged computed ephemeris. The ephemeris extensions or future ephemeris may be continuously developed and refined whenever new broadcast ephemeris and/or satellite measurement becomes available. The ephemeris extensions may comprise future ephemeris in next several days. The ephemeris extensions may provide current (fresh) ephemeris over a particular period such as the next several days to the GNSS enabled mobile device 110a without the GNSS enabled mobile device 110a receiving and/or completely receiving updated broadcast ephemeris from the related GNSS satellites. By using the ephemeris extensions, the GNSS enabled mobile device 110a may be operable to accurately estimate its position fix in next several days without current (fresh) broadcast ephemeris received from corresponding visible GNSS satellites.

A GNSS satellite such as the GNSS satellite 120a may comprise suitable logic, circuitry, interfaces and/or code that is operable to provide satellite navigational information to various GNSS receivers on earth. The GNSS receivers, which comprise GPS, GALILEO and/or GLONASS receivers, are integrated within or externally coupled to GNSS capable mobile devices such as the GNSS enabled mobile devices 110a through 110d. The GNSS satellite 120a may be operable to broadcast its own ephemeris periodically, for example, once every 30 seconds. The broadcast ephemeris may be transmitted at a rate of, for example, 50 bits per second, taking 18 seconds in all for a complete ephemeris transmission. The broadcast ephemeris may be utilized to calculate navigation information such as, for example, position, velocity, and clock information of the GNSS receivers. The GNSS satellite 120a may be operable to update ephemeris, for example, every two hours. The broadcast ephemeris may be valid for a limited time period such as, for example, 2 to 4 hours into the future (from the time of broadcast).

The communication network 130 may comprise suitable logic, circuitry, interfaces and/or code that may be operable to provide data services to various mobile devices such as the GNSS enabled mobile devices 110a-110d on a large-scale basis by using a particular technology such as Ethernet, 3GPP, 3GPP2, LTE, Bluetooth, WiFi, or WiMAX. The communication network 130 may be a wired high-speed connection such as an Ethernet network, or may be a wireless network such as, for example, a 3GPP, 3GPP2, LTE, Bluetooth, WiFi, or WiMAX network.

In an exemplary operation, a GNSS enabled mobile device such as the GNSS enabled mobile device 110a may be operable to receive GNSS signals from a plurality of visible GNSS satellites such as, for example, the GNSS satellites 120a-120d. The GNSS enabled mobile device 110a may be operable to extract ephemeris from the received GNSS signals to calculate a position fix and/or a velocity of the GNSS enabled mobile device 110a. The GNSS enabled mobile device 110a may be operable to utilize the extracted ephemeris or the received GNSS signals to calculate ephemeris extensions comprising future ephemeris in next several days or other period of time for each of the visible GNSS satellites. The calculated ephemeris extensions may provide current (fresh) ephemeris for next several days or other period of time to the GNSS enabled mobile device 110a. The GNSS enabled mobile device 110a may be operable to utilize the calculated ephemeris extensions over the next several days or other period of time to accurately estimate a position fix without current (fresh) broadcast ephemeris received and/or completely received from the corresponding visible GNSS satellites.

Figure 2:
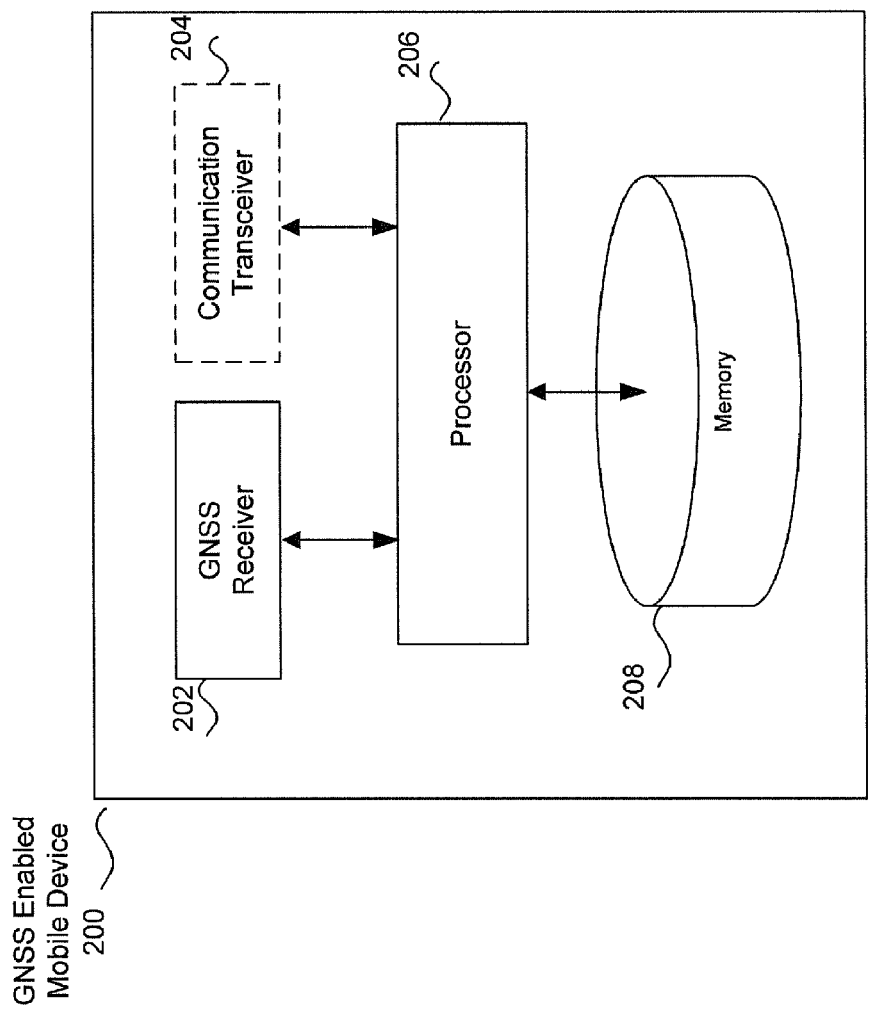
FIG. 2 is a block diagram illustrating an exemplary GNSS enabled mobile device that is operable to determine satellite orbits using self-assisted ephemeris extension, in accordance with an embodiment of the invention.

FIG. 2 is a block diagram illustrating an exemplary a GNSS enabled mobile device that is operable to determine satellite orbits using self-assisted ephemeris extension, in accordance with an embodiment of the invention. Referring to FIG. 2, there is shown a GNSS enabled mobile device 200. The GNSS enabled mobile device 200 may comprise a GNSS receiver 202, a communication transceiver 204, a processor 206, and a memory 208.

The GNSS receiver 202 may comprise suitable logic, circuitry, interfaces and/or code that may be operable to receive GNSS signals from a plurality of visible GNSS satellites. The received GNSS signals may comprise satellite navigation information such as ephemeris and/or clock model, which may be utilized accurately determining related satellite orbits and calculating navigation information such as, for example, a position fix and/or velocity of the GNSS receiver 202. In this regard, the GNSS receiver 202 may be operable to use available ephemeris such as present broadcast ephemeris and/or historic broadcast ephemeris to calculate or predict ephemeris extensions in an extended period such as the next several days for each of the visible GNSS satellites. The calculated ephemeris extensions may be continuously developed and refined every time when a new broadcast ephemeris and/or satellite measurement becomes available. The calculated ephemeris extensions may comprise future ephemeris and provide current (fresh) ephemeris in next several days to the GNSS receiver 202 in next several days. By using the calculated ephemeris extensions, the GNSS receiver 202 may be operable to accurately calculate a position fix and/or velocity of the GNSS receiver 202 for an extended period such as the next several days without current (fresh) broadcast ephemeris received and/or completely received from corresponding visible GNSS satellites.

The communication transceiver 204 may comprise suitable logic, circuitry, interfaces and/or code that may be operable to transmit and/or receive radio signals over the communication network 130. In this regard, the transmitted radio signals may comprise navigation information of the GNSS enabled mobile device 200, which may be derived from ephemeris extensions calculated by the GNSS receiver 202. The existence of the communication transceiver 204 may be optional.

Although the GNSS enabled mobile device 200 with communication function via the communication transceiver 204 is illustrated in FIG. 2 for self-assisted ephemeris extensions, the invention may not be so limited. Accordingly, the invention may be applied to a GNSS enabled device without communication function, other than receiving GNSS signals from visible GNSS satellites without departing from the spirit and scope of various embodiments of the invention.

The processor 206 may comprise suitable logic, circuitry, interfaces and/or code that may be operable to process navigation information from the GNSS receiver 202 as well as signals communicated with the telecommunication network 130 via the communication transceiver 204. The processor 206 may be operable to communicate the navigation information from the GNSS receiver 202 with the telecommunication network 130 for various location-based client applications such as friend finders and/or emergency calling. The processor 206 may be operable to control operation cycles of the GNSS receiver 202. For example, to conserve power in the GNSS enabled mobile device 200, the processor 206 may be operable to turn ON or OFF the GNSS receiver 202 on an as needed basis.

The memory 208 may comprise suitable logic, circuitry, and/or code that operable to store information such as executable instructions and data that may be utilized by the processor 206. The memory 208 may comprise RAM, ROM, low latency nonvolatile memory such as flash memory and/or other suitable electronic data storage.

In an exemplary operation, the GNSS receiver 202 may be operable to receive GNSS signals from each of the visible GNSS satellites. The GNSS receiver 202 may be operable to extract broadcast ephemeris from the received GNSS signals. The GNSS receiver 202 may be configured to utilize available ephemeris such as present and/or historic extracted broadcast ephemeris to calculate ephemeris extensions for an extended period such as the next several days for each visible of the GNSS satellites. The calculated ephemeris extensions may provide current (fresh) ephemeris in next several days to the GNSS receiver 202. The GNSS receiver 202 may be operable to accurately calculate a position fix and/or velocity of the GNSS receiver 202 for an extended period such as the next several days without receiving and/or completely receiving current (fresh) broadcast ephemeris from corresponding visible GNSS satellites. Information of the calculated position fix may be forwarded to the processor 206 and processed to communicate with the communication network 130 via the communication transceiver 204 for a location-based client application such as roadside assistance.

Figure 3:
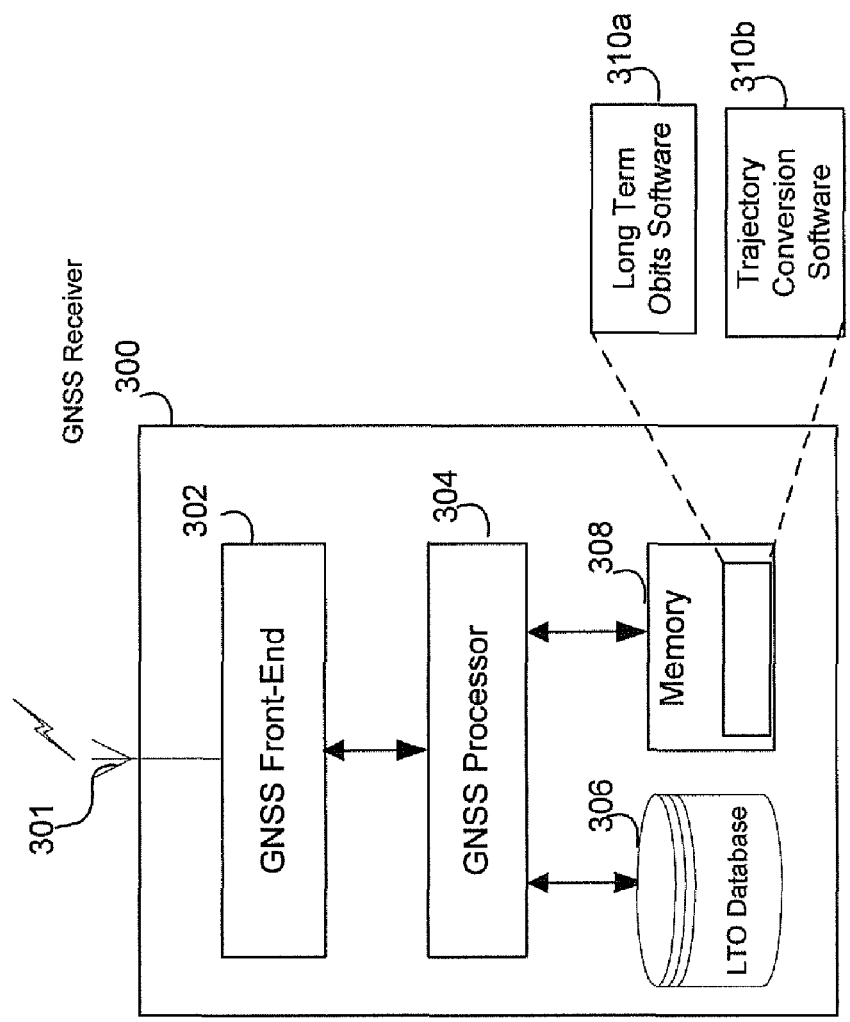
FIG. 3 is a block diagram illustrating an exemplary GNSS receiver that is operable to create ephemeris extension using available ephemeris and/or satellite measurements, in accordance with an embodiment of the invention.

FIG. 3 is a block diagram illustrating an exemplary GNSS receiver that is operable to create ephemeris extension using available ephemeris and/or satellite measurements, in accordance with an embodiment of the invention. Referring to FIG. 3, there is shown a GNSS receiver 300. The GNSS receiver 300 may comprise a GNSS antenna 301, a GNSS front-end 302, a GNSS processor 304, a long-term orbits (LTO) database 306, and a memory 308. The memory 308 may comprise long-term orbits software 310a and trajectory conversion software 310b.

The GNSS antenna 301 may comprise suitable logic, circuitry, interfaces and/or code that may be operable to receive GNSS signals from a plurality of visible GNSS satellites such as the GNSS satellites 120a through 120d. The GNSS antenna 301 may be operable to communicate the received GNSS signals to the GNSS front-end 302 for further processing.

The GNSS front-end 302 may comprise suitable logic, circuitry, interfaces and/or code that may be operable to convert the received GNSS signals to GNSS baseband signals, which may be suitable for further processing in the GNSS processor 304 for calculating navigation information of the GNSS receiver 300.

The GNSS processor 304 may comprise suitable logic, circuitry, interfaces and/or code that may be operable to process GNSS baseband signals from the GNSS front-end 302. The GNSS processor 304 may be operable to extract ephemeris comprising satellite navigational information from the GNSS baseband signals. The GNSS processor 304 may be configured to calculate or predict ephemeris extensions or future ephemeris in next several days for corresponding visible GNSS satellites using available ephemeris such as the extracted present and/or historic broadcast ephemeris. The GNSS processor 304 may be operable to refine the calculated ephemeris extensions with new broadcast ephemeris and/or new satellite measurements. The calculated ephemeris extensions may comprise predicted or future ephemeris for an extended period such as the next several days.

The GNSS processor 304 may be operable to calculate or predict ephemeris of related GNSS satellites in a way by propagate available ephemeris using various multi-step numerical integration methods such as Gauss-Jackson method. The available ephemeris may comprise present broadcast ephemeris, historic broadcast ephemeris, and aged estimated ephemeris. With assistance of the calculated ephemeris extensions, the GNSS processor 304 may be operable to accurately calculate a position fix of the GNSS receiver 300 in next several days without fresh broadcast ephemeris received and/or completely received from related GNSS satellites. For each of the visible GNSS satellites, the GNSS processor 304 may be operable to generate and/or update corresponding ephemeris extensions according to a specific schedule. Factors such as the age of available ephemeris extensions and/or the time of visibility of the corresponding GNSS satellites may be considered when schedule generating ephemeris extensions for a specific visible GNSS satellite.

In instances where the generated ephemeris extensions may not match an orbit model and/or format desired or supported by an associated mobile device such as the GNSS enabled mobile device 200, the GNSS processor 304 may be operable to reformat the generated ephemeris extensions into the desired orbit model and/or format prior to the calculation of, for example, a position fix of the GNSS receiver 300. The GNSS processor 304 may be operable to store the generated ephemeris extensions into the LTO database 306 for accurately computing a position fix of the GNSS receiver 300 even without current (fresh) broadcast ephemeris received and/or completely received from corresponding visible GNSS satellites. In this regard, the generated ephemeris extensions may be polynomial fitted with a step size of, for example, 180 seconds. The resulting polynomial fit routine may be stored inside the LTO database 306 instead of actual predicted ephemeris to conserve storage space of the GNSS receiver 300.

In addition, the GNSS processor 304 may be operable to communicate with a computer server for one or more orbit model parameters, which may be calculated and/or updated on the computer server using associated resources such as computing power, memory and more historic ephemeris data. The GNSS processor 304 may be operable to utilize the one or more orbit model parameters downloaded from the computer server to perform orbit propagation. Accordingly, the accuracy of the resulting ephemeris extensions may be improved at low cost.

The LTO database 306 may comprise suitable logic, circuitry, interfaces and/or code that may be operable to manage and store data comprising ephemeris polynomial fit routines for each of the visible GNSS satellites. The ephemeris polynomial fit routines in the LTO database 306 may be updated as a needed base or periodically.

The memory 308 may comprise suitable logic, circuitry, interfaces and/or code that may enable storage of information such as executable instructions and data that may be utilized by the GNSS processor 304. The executable instructions may comprise algorithms that may be enabled to calculate a position fix of the GNSS receiver 300 using fresh ephemeris provided by the LTO database 306. The memory 308 may comprise the long term orbits software 310a that may be utilized to propagate available ephemeris for corresponding viable GNSS satellites. The memory 308 may comprise the trajectory conversion software 310b that may be utilized to convert predicted ephemeris in the LTO database 306 into an orbit model and/or format desired or supported by an associated device such as the GNSS enabled mobile device 110a. The memory 308 may comprise data such as local GNSS measurements and navigation data. The memory 308 may comprise RAM, ROM, low latency nonvolatile memory such as flash memory and/or other suitable electronic data storage.

In an exemplary operation, the GNSS antenna 301 may be operable to receive GNSS signals from a plurality of viable GNSS satellites. The received GNSS signals may be communicated with the GNSS front-end 302. The GNSS front-end 302 may be operable to convert the received GNSS broadcast signals into GNSS baseband signals for further processing in the GNSS processor 304. The GNSS processor 304 may be operable to generate ephemeris extensions or future ephemeris for an extended period such as the next several days for corresponding visible GNSS satellites using available ephemeris such as broadcast ephemeris extracted from the received GNSS baseband signals. The GNSS processor 304 may be operable to generate ephemeris extensions by propagating available ephemeris using various multi-step numerical integration methods such as, for example, Gauss-Jackson method. The generation of ephemeris extensions for a specific GNSS satellite may be scheduled according to, for example, the age of available ephemeris extensions in the LTO database 306 and/or the time of visibility of corresponding visible GNSS satellites. The GNSS processor 304 may be operable to reformat the generated ephemeris extensions into a desired orbit model and/or format of an associated mobile device such as the GNSS enabled mobile device 200. The GNSS processor 304 may be operable to curve fit the generated ephemeris extensions and store resulting ephemeris polynomial fit routines in the LTO database 306 to conserve storage space.

Figure 4:
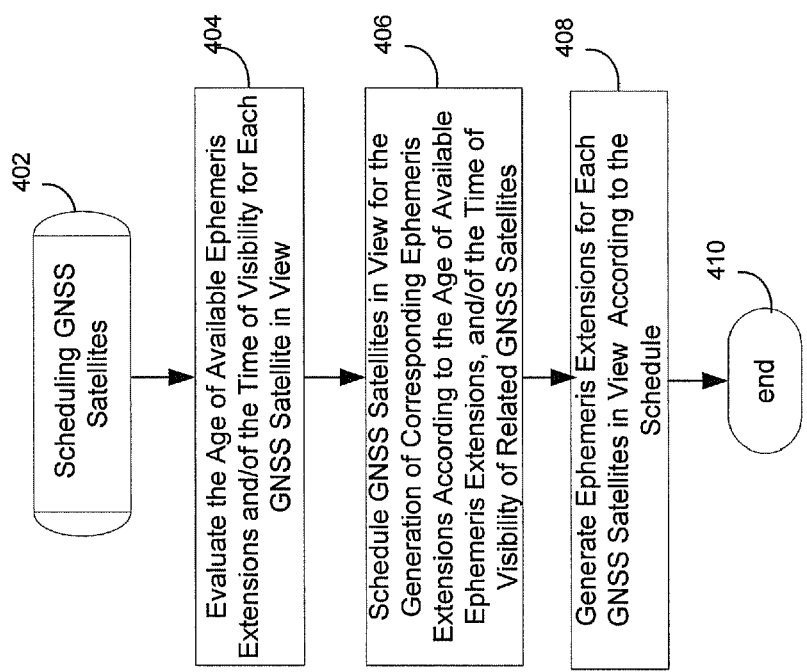
FIG. 4 a flow chart illustrating an exemplary scheduling procedure that is utilized to generate ephemeris extension in a GNSS receiver, in accordance with an embodiment of the invention.

FIG. 4 a flow chart illustrating an exemplary scheduling procedure that is utilized to generate ephemeris extension in a GNSS receiver, in accordance with an embodiment of the invention. Referring to FIG. 4, the exemplary steps may start with the step 402. In step 402, the GNSS receiver 300 may need to schedule a plurality of GNSS visible satellites for generating ephemeris extensions comprising future ephemeris for an extended period such as the next several days. Depending on configuration, the GNSS receiver 300 may be operable to schedule the visible GNSS satellites currently or future, for example, 4 days later. In step 404, for each of the visible GNSS satellites, the GNSS receiver 300 may be operable to evaluate the age of available ephemeris extensions in the LTO database 306 and/or the time of visibility. In step 406, the GNSS receiver 300 may be operable to schedule the generation of corresponding ephemeris extensions, for the visible GNSS satellites, according to the age of available ephemeris extensions in the LTO database 306, and/of the time of visibility of corresponding GNSS satellites. In step 408, the GNSS receiver 300 may be operable to generate ephemeris extensions for each of the visible GNSS satellites according to the schedule. The exemplary steps may end at step 410.

Figure 5:
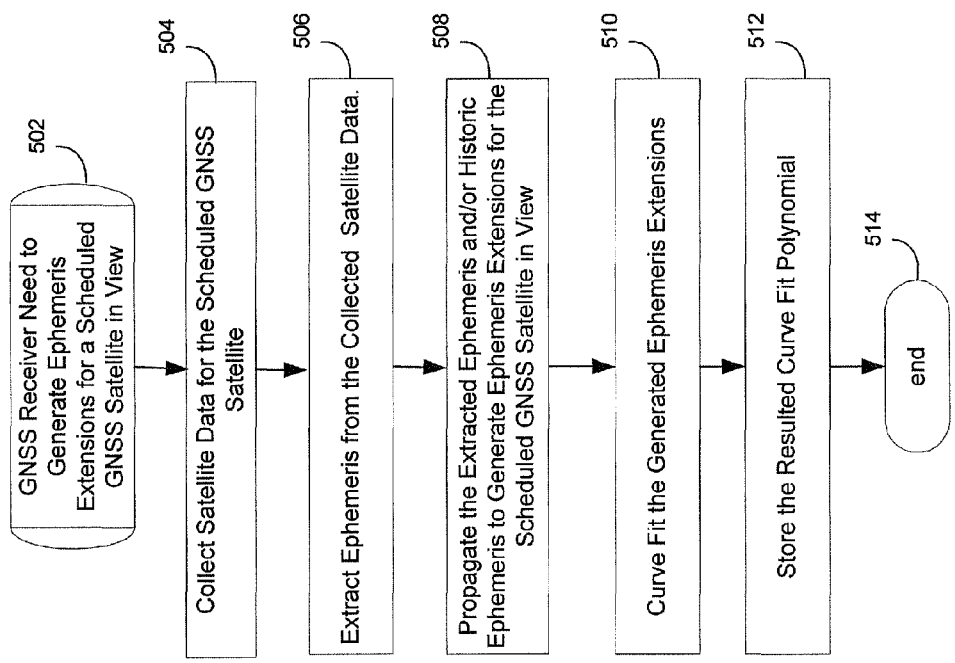
FIG. 5 is a flow chart illustrating an exemplary extended ephemeris generation procedure used in a GNSS receiver, in accordance with an embodiment of the invention.

FIG. 5 is a flow chart illustrating an exemplary extended ephemeris generation procedure used in a GNSS receiver, in accordance with an embodiment of the invention. Referring to FIG. 5, the exemplary steps may start with the step 502. In step 502, the GNSS receiver 300 may be need to generate ephemeris extensions for a visible GNSS satellite such as the GNSS satellite 120a. In step 504, the GNSS receiver 300 may be operable to collect satellite data via the GNSS front-end 302 for the GNSS satellite 120a. In step 506, the GNSS processor 304 may be operable to extract satellite navigational information such as ephemeris from the collected satellite data. In step 508, GNSS processor 304 may be operable to propagate available ephemeris such as present and/or historic extracted broadcast ephemeris to generate ephemeris extensions for the GNSS satellite 120a. In step 510, the GNSS processor 304 may be operable to curve fit the generated ephemeris extensions. In step 512, the GNSS processor 304 may be configured to store resulting curve fitting polynomial into the LTO database 306. The exemplary steps may end at step 514.

Figure 6:
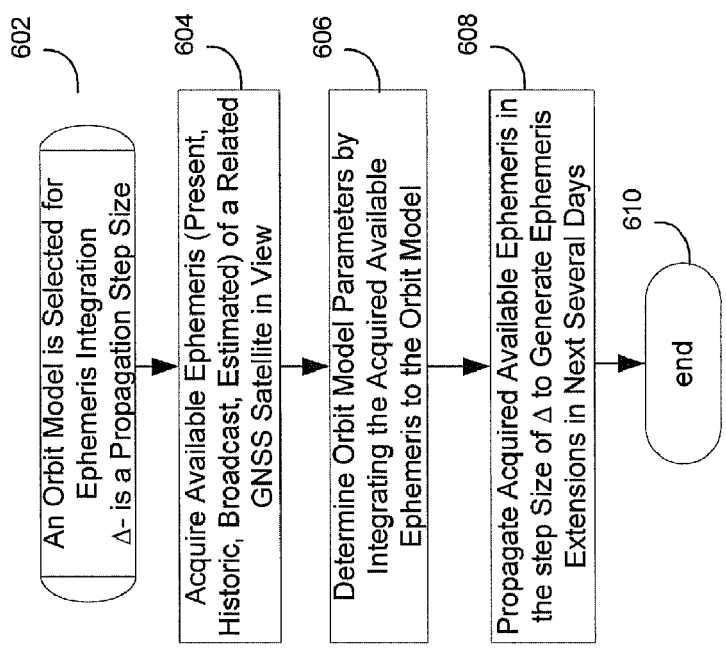
FIG. 6 is a flow chart illustrating an exemplary propagation procedure that is utilized to generate ephemeris extension in a GNSS receiver, in accordance with an embodiment of the invention.

FIG. 6 is a flow chart illustrating an exemplary propagation procedure that is utilized to generate ephemeris extension in a GNSS receiver, in accordance with an embodiment of the invention. Referring to FIG. 6, the exemplary steps may start with the step 602. In step 602, for a visible GNSS satellite, the GNSS receiver 300 may utilize a selected orbit model solar radiation pressure model for ephemeris integration. The parameter $\Delta$ may comprise a propagation step size. In step 604, the GNSS receiver 300 may be operable to acquire available ephemeris of a corresponding visible GNSS satellite. The available ephemeris may comprise present broadcast ephemeris, historic broadcast ephemeris, and/or aged estimated ephemeris available at the GNSS receiver 300. In step 606, the GNSS receiver 300 may be operable to determine orbit model parameters by integrating the acquired available ephemeris to the orbit model using various multi-step numerical integration methods, for example, Gauss-Jackson method. In step 608, the GNSS receiver 300 may be operable to utilize the orbit model with the determined model parameters to propagate the acquired available ephemeris in the step size of $\Delta$ to generate ephemeris extensions in next several days for the corresponding visible GNSS satellite. The exemplary steps may end at step 610.

Figure 7:
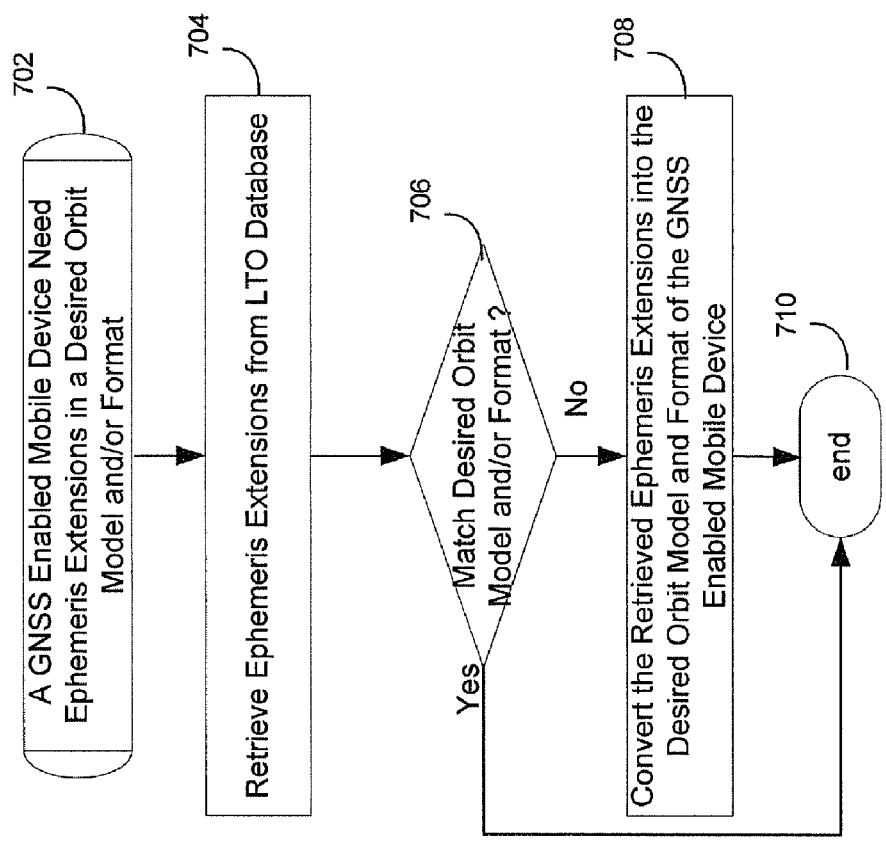
FIG. 7 is a flow chart illustrating an exemplary reformatting procedure that is utilized to reformat ephemeris extension in a GNSS receiver, in accordance with an embodiment of the invention.

FIG. 7 is a flow chart illustrating an exemplary reformatting procedure that is utilized to reformat ephemeris extension in a GNSS receiver, in accordance with an embodiment of the invention. Referring to FIG. 7, the exemplary steps may start with the step 702. In step 702, a GNSS enabled mobile device such as the GNSS enabled mobile device 110a may need to use ephemeris extensions in an orbit model and/or format desired or supported by associated mobile device such as the GNSS enabled mobile device 110a. In step 704, the GNSS processor 304 may be operable to retrieve ephemeris extensions, which may be provided in a form of corresponding curve fitting polynomial, from LTO database 308. In step 706, it may be determined whether the retrieved ephemeris extensions match the desired orbit model and/or format of the GNSS enabled mobile device 110a. In instances where the retrieved ephemeris extensions may not match the desired orbit model and/or format of the GNSS enabled mobile device 110a, then in step 708, the GNSS processor may be utilize the trajectory conversion software 310b to convert the retrieved ephemeris extensions into the desired orbit model and/or format of the GNSS enabled mobile device 110a. The exemplary steps stop in step 710.

In step 706, in instances where the retrieved ephemeris extensions may match the desired orbit model and/or format of the GNSS enabled mobile device 110a, then the exemplary steps stop in step 710.

In various exemplary aspects of the invention may provide a method and system for a GNSS receiver with self-assisted ephemeris extensions. A GNSS enabled mobile device, such as the GNSS enabled mobile device 110a, may be operable to receive GNSS signals via the GNSS receiver 202 from a plurality of visible GNSS satellites such as the GNSS satellites 120a through 120d. The GNSS receiver 202 in the GNSS enabled mobile device 110a may be operable to extract broadcast ephemeris from the received GNSS signals and utilize the extracted information to generate ephemeris extension or future ephemeris for an extended period such as the next several days for each of the plurality of visible GNSS satellites such as the GNSS satellites 120a through 120d. The generated future ephemeris may be utilized to determine a position fix of the GNSS enabled mobile device 110a. The generated future ephemeris may enable accurately determination of a position fix for the GNSS enabled mobile device 110a for an extended period such as the next several days even without the GNSS enabled mobile device 110a receiving and/or completely receiving fresh broadcast ephemeris from the GNSS satellites 120a through 120d.

The GNSS enabled mobile device 110a may be operable to schedule the generation of future ephemeris for each of the GNSS satellites 120a through 120d according to factors such as, for example, the age of available ephemeris extensions in the LTO database 306 and/or the time of visibility of related GNSS satellites. Further ephemeris may be generated for each of the visible GNSS satellites by integrating available ephemeris such as present or historic broadcast ephemeris into a selected orbit model such as solar radiation pressure model. Various multi-step numerical integration methods such as Gauss-Jackson method may be used to determine associated orbit model parameters. The resulting orbit model may be used to propagate the available ephemeris of related GNSS satellites for the generation of corresponding future ephemeris. The generated future ephemeris may be reformatted into a desired model and/or format of the GNSS enabled mobile device 110a. The generated future ephemeris may be curve fitted to determine a curve fitting polynomial for each of the visible GNSS satellites. The determined curve fitting polynomial may be stored in the LTO database 306 in stead of storing actual generated future ephemeris to conserve storage space inside the GNSS enabled mobile device 110a.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for a GNSS receiver with self-assisted ephemeris extension.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for location, the method comprising:
   performing by one or more processors and/or circuits in a Global Navigation Satellite Systems (GNSS) enabled mobile device:
   receiving GNSS signals from a plurality of visible GNSS satellites; and
   generating future ephemeris on said GNSS enabled mobile device, said generating comprising performing numerical integration using said received GNSS signals for each of said plurality of visible GNSS satellites.

2. The method according to claim 1, comprising determining a position fix for said GNSS enabled mobile device using at least one of said generated future ephemeris for said plurality of visible GNSS satellites.

3. The method according to claim 1, comprising determining a position fix for said GNSS enabled mobile device before said GNSS enabled mobile device receives fresh broadcast ephemeris from said plurality of visible GNSS satellites.

4. The method according to claim 1, comprising scheduling said generation according to respective age of available future ephemeris and/or time of visibility of corresponding GNSS satellites.

5. The method according to claim 1, comprising integrating respective available broadcast ephemeris to an orbit model for each of said plurality of visible GNSS satellites.

6. The method according to claim 5, comprising performing said numerical integration to determine respective orbit model parameters of said orbit model for each of said plurality of visible GNSS satellites.

7. The method according to claim 5, comprising propagating said respective available broadcast ephemeris using said orbit model to generate said future ephemeris for each of said plurality of visible GNSS satellites.

8. The method according to claim 7, comprising reformatting said generated future ephemeris into a model or format supported by said GNSS enabled mobile device.

9. The method according to claim 7, comprising curve fitting said generated future ephemeris for each of said plurality of visible GNSS satellites to determine a corresponding curve fitting polynomial.

10. The method according to claim 1, wherein said numerical integration is based on a Gauss-Jackson numerical integration.

11. A system for communication, the system comprising:
one or more processors and/or circuits for use in a Global Navigation Satellite Systems (GNSS) enabled mobile device, wherein said one or more processors and/or circuits are operable to:
receive GNSS signals from a plurality of visible GNSS satellites; and
generate future ephemeris on said GNSS enabled mobile device, said generation comprising performing numerical integration using said received GNSS signals for each of said plurality of visible GNSS satellites.

12. The system according to claim 11, wherein said one or more processors and/or circuits are operable to determine a position fix for said GNSS enabled mobile device using at least one of said generated future ephemeris for said plurality of visible GNSS satellites.

13. The system according to claim 11, wherein said one or more processors and/or circuits are operable to determine a position fix for said GNSS enabled mobile device before said GNSS enabled mobile device receives fresh broadcast ephemeris received from said plurality of visible GNSS satellites.

14. The system according to claim 11, wherein said one or more processors and/or circuits are operable to schedule said plurality of GNSS satellites in view for said generation according to respective age of available future ephemeris and/or time of visibility of corresponding GNSS satellites.

15. The system according to claim 11, wherein said one or more processors and/or circuits are operable to integrate respective available broadcast ephemeris to an orbit model for each of said plurality of visible GNSS satellites.

16. The system according to claim 15, wherein said one or more processors and/or circuits are operable to perform said numerical integration to determine respective orbit model parameters of said orbit model for each of said plurality of visible GNSS satellites.

17. The system according to claim 15, wherein said one or more processors and/or circuits are operable to propagate said respective available broadcast ephemeris using said orbit model to generate said future ephemeris for each of said plurality of visible GNSS satellites.

18. The system according to claim 17, wherein said one or more processors and/or circuits are operable to reformat said generated future ephemeris into a model or format supported by said GNSS enabled mobile device.

19. The system according to claim 17, wherein said one or more processors and/or circuits are operable to curve fit said generated future ephemeris for each of said plurality of visible GNSS satellites to determine respective a corresponding curve fitting polynomial.

20. The system according to claim 19, wherein said one or more processors and/or circuits are operable to store said determined corresponding curve fitting polynomial instead of said generated future ephemeris for each of said plurality of visible GNSS satellites.

21. The system according to claim 11, wherein said numerical integration is based on a Gauss-Jackson numerical integration.

22. A system for communication, the system comprising:
one or more processors and/or circuits for use in a Global Navigation Satellite Systems (GNSS) enabled mobile device, wherein said one or more processors and/or circuits are operable to:
receive GNSS signals from a plurality of visible GNSS satellites;
generate future ephemeris on said GNSS enabled mobile device, said generation comprising performing numerical integration using said received GNSS signals for each of said plurality of visible GNSS satellites;
convert the generated future ephemeris into a curve-fitting polynomial; and
convert the curve-fitting polynomial to an orbit model supported by the GNSS enabled mobile device based on a trajectory conversion operation,
scheduling said generation according to respective age of available future ephemeris.

* * * * *

UNITED STATES PATENT AND TRADEMARK OFFICE
CERTIFICATE OF CORRECTION

PATENT NO. : 8,164,518 B2  Page 1 of 1
APPLICATION NO. : 12/487763
DATED : April 24, 2012
INVENTOR(S) : van Diggelen et al.

It is certified that error appears in the above-identified patent and that said Letters Patent is hereby corrected as shown below:

Title Page
Item (12), please replace "Diggelen et al." with --van Diggelen et al.--.

In the Claims
Column 12, Claim 19
Line 19, please replace "respective a" with --a respective--.

Signed and Sealed this
Seventeenth Day of December, 2013

Margaret A. Focarino
*Commissioner for Patents of the United States Patent and Trademark Office*